United States Patent [19]

Dorgan

[11] Patent Number: 5,195,600
[45] Date of Patent: Mar. 23, 1993

[54] ELECTRIC DRIVE SYSTEM FOR TRACK-LAYING VEHICLES

[75] Inventor: Robert J. Dorgan, Pittsfield, Mass.

[73] Assignee: General Electric Company, Pittsfield, Mass.

[21] Appl. No.: 729,245

[22] Filed: Jul. 11, 1991

[51] Int. Cl.⁵ .......................................... B62D 55/00
[52] U.S. Cl. ........................ 180/9.1; 180/65.2; 180/305; 180/6.2; 475/5; 475/27; 475/28
[58] Field of Search ............... 180/9.1, 302, 305, 96.6, 180/365, 367, 6.7, 6.66, 6.62, 6.3, 6.2, 65.2, 9.1; 475/24, 23, 22, 28, 73, 83, 72, 5, 6, 27; 74/661, 881

[56] References Cited

U.S. PATENT DOCUMENTS

| | | | |
|---|---|---|---|
| 3,503,278 | 8/1968 | Livezey | 74/661 |
| 4,090,415 | 5/1978 | Gorrell et al. | 180/69.6 |
| 4,270,622 | 6/1981 | Travis | 180/65.4 |
| 4,392,393 | 7/1983 | Montgomery | 74/661 |
| 4,497,218 | 2/1985 | Zaunberger | 475/28 X |
| 4,803,897 | 2/1989 | Reed | 475/6 |
| 4,815,334 | 3/1989 | Lexen | 74/661 |
| 4,825,721 | 5/1989 | Gabriele | 475/5 X |
| 4,848,186 | 7/1989 | Dorgan et al. | 475/73 X |
| 4,928,552 | 5/1990 | Gabriele | 475/5 |
| 4,997,412 | 3/1991 | Reed | 475/24 |
| 5,030,177 | 7/1991 | Reed | 475/21 X |
| 5,041,064 | 8/1991 | Eickhoff et al. | 475/27 X |

Primary Examiner—Charles A. Marmor
Assistant Examiner—Kevin Hurley
Attorney, Agent, or Firm—Stephen A. Young

[57] ABSTRACT

An electric drive system for tracklaying vehicles includes a pair of electric motors and an infinitely variable speed, hydromechanical steering transmission including a pair of hydrostatic propulsion units and a plurality of planetary gears sets. The hydrostatic units are driven by one or both of the electric motors to produce separate hydrostatic propulsion outputs which are combined with the mechanical outputs of the motors by the planetary gear sets to generate separate hydromechanical propulsion outputs on right and left transmission output shafts for vehicle propulsion and steer in two speed ranges.

16 Claims, 3 Drawing Sheets

ELECTRIC DRIVE SYSTEM FOR TRACK-LAYING VEHICLES

The present invention relates to drive systems for track-laying vehicles and particularly to a drive system utilizing electric motors as the vehicle prime mover.

BACKGROUND OF THE INVENTION

It is anticipated that future military fighting vehicles, such as tanks, which will likely be of the track-laying type, will utilize electric power to drive their weapons systems. Consequently, significant research efforts are being directed to developing electric drives for tank weapons systems. Under these circumstances, it would be advantageous to scale up the weapons systems electric drive, such that it could also be used to power vehicle propulsion, i.e., the weapons and vehicle propulsion systems share a common electric power supply. Since track-laying vehicles require imposing speed differentials on the two vehicle tracks to execute steering maneuvers in skid-steer fashion, the straight forward approach to electric vehicle propulsion would seem to be to provide a separate electric motor to drive each track. Unfortunately, because of the large torque ratios required and the need to transfer regenerative power from the inside track to the outside track during a steer, this approach is not particularly practical.

SUMMARY OF THE INVENTION

It is accordingly an objective of the present invention to provide an electric drive system for a track-laying vehicle. The system utilizes an infinitely variable speed, hydromechanical steering transmission to combine the mechanical outputs of a pair of electric motors in mechanical and hydraulic drive paths to the two vehicle tracks to achieve vehicle straightline and steer propulsion in a highly controllable and effective manner.

To this end, the mechanical output of a first of the pair of electric motors drives a pair of hydrostatic propulsion units to produce right and left hydrostatic outputs which are respectively combined with the mechanical output of the first motor to produce left and right hydromechanical transmission outputs for first range straightline and steer propulsion. For second range straightline and steer propulsion, the mechanical output of the second electric motor is additively combined with the left and right hydromechanical outputs produced by the first motor. Alternatively, the mechanical output of the second motor may be combined with the hydromechanical outputs of the first motor to produce straightline and steer propulsion in both ranges. As a further alternative, the mechanical output of the first motor may be used solely to drive the hydrostatic propulsion units and thus produce only left and right hydrostatic outputs for first range straightline and steer propulsion.

The invention accordingly comprises the features of construction, combinations of elements and arrangements of parts, all as detailed hereinafter, and the scope of the invention will be indicated in the claims.

BRIEF DESCRIPTION OF THE DRAWINGS

For a full understanding of the nature and objects of the present invention, reference may be had to the following Detailed Description taken in connection with the following drawings, in which.

Like reference numerals refer to corresponding parts throughout the several views of the drawings.

DETAILED DESCRIPTION

Figure 1:
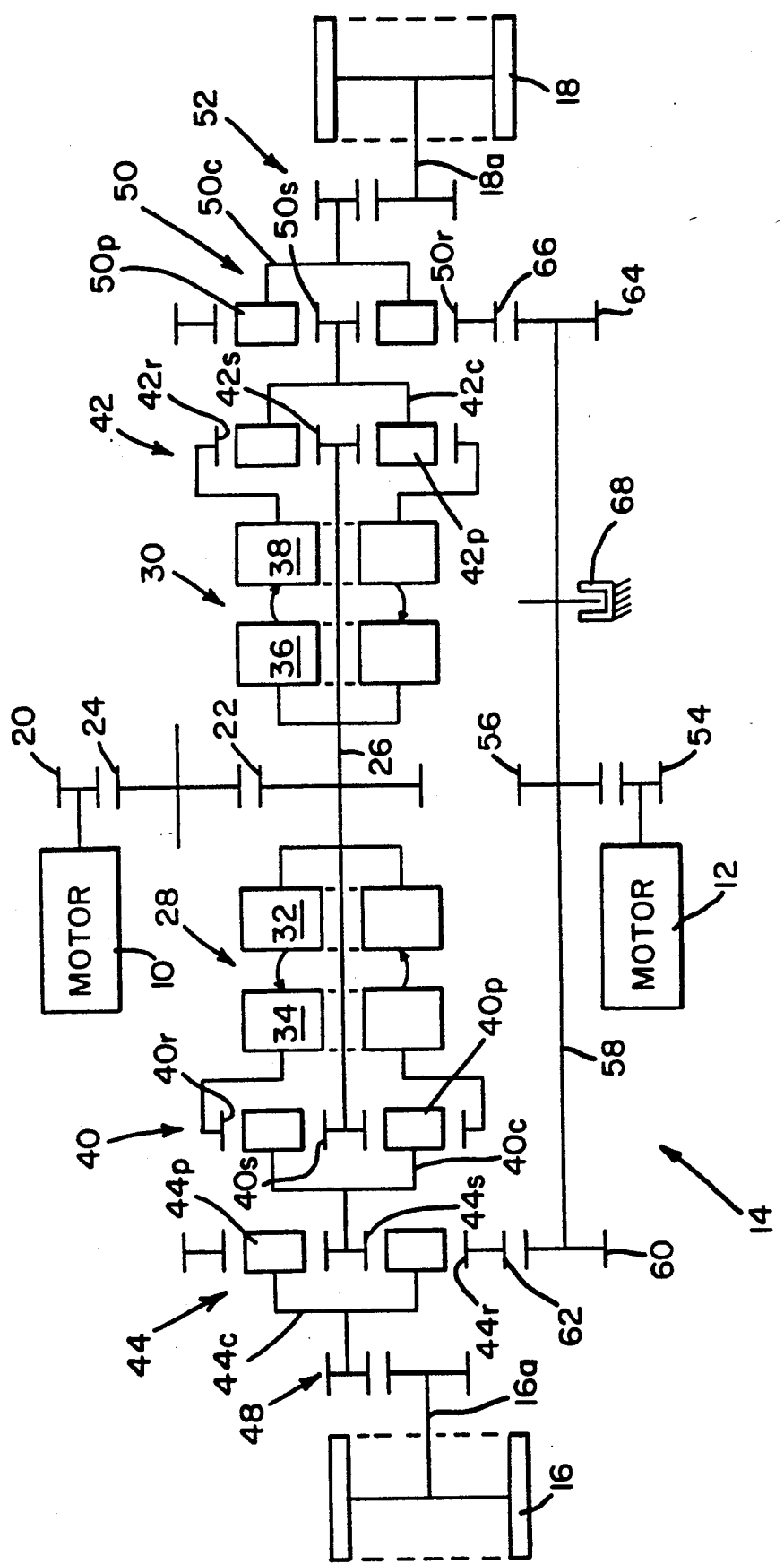
FIG. 1 is a schematic diagram of an electric drive system construed in accordance with one embodiment of the present invention to propel a track-laying vehicle.

In the embodiment of the invention seen in FIG. 1, a pair of electric motors 10 and 12 are utilized as an electric drive producing mechanical inputs to an infinitely variable speed, hydromechanical steering transmission, generally indicated at 14, to, in turn, propel left 16 and right 18 tracks of a track-laying vehicle, such as a military tank. These electric motors draw electrical power from an onboard motor-generator set or, for a small vehicle, storage batteries (not shown). The mechanical output of motor 10 on pinion gear 20 is applied to a spur gear 22 through an idler gear 24. The spur gear is fixed on a cross shaft 26 which is drivingly connected with a left hydrostatic propulsion unit, generally indicated at 28, and a right hydrostatic propulsion unit, generally indicated at 30. Hydrostatic unit 28 includes a hydraulic pump 32 and a hydraulic motor 34 connected in a closed loop hydraulic fluid circuit. Hydrostatic unit 30 is identically constructed to include a hydraulic pump 36 in hydraulic fluid flow communication with a hydraulic motor 38. The hydraulic pumps and motors of these units may be of the ball piston type, such as disclosed in Reed U.S. Pat. No. 3,815,698.

The hydrostatic output of hydraulic motor 34 is applied to the ring gear 40r of a planetary gear set, generally indicated at 40, whose sun gear 40s receives the mechanical output of electric motor 10 appearing on cross shaft 26. In the same manner, the hydrostatic output of hydraulic motor 38 is applied to the ring gear 42r of a planetary gear set, generally indicated at 42, whose sun gear 42s is also driven by the mechanical output of motor 10 on cross shaft 26. The carrier 40c for planetary pinion gears 42p of planetary gear set 40 applies the combination of the hydraulic motor 34 hydrostatic output and the electric motor 10 mechanical output as a hydromechanical output to the sun gear 44s of left output planetary gear set, generally indicated at 44. The carrier 44c for pinion gears 44p of planetary gear set 44 applies this hydromechanical output to the left transmission output shaft 16a and tracks 16 via a gear set, generally indicated at 48. In the same manner, planetary gear set 42 combines the hydrostatic output of hydraulic motor 38 and the mechanical output of electric motor 10 to produce a hydromechanical output on carrier 42c for pinion gears 42p, which drives the sun gear 50 of a right output planetary gear set, generally indicated at 50. This hydromechanical output is applied to the right transmission output shaft 18a and track 18 via a gear set, generally indicated at 52.

The mechanical output of electric motor 12 on pinion 54 drives a spur gear 56 fixed on a cross shaft 58. A spur gear 60 at the left end of this cross shaft meshes with a gear 62 common with ring gear 44r of planetary gear set 44. Then a spur gear 64 at the right end of cross shaft 58 meshes with a gear 66 common with ring gear 50r of planetary gear set 50. A brake 68 serves to ground cross shaft 58 when transmission 14 is operating in a low or first speed range and to release this cross shaft for transmission operation in a high or second speed range. It is thus seen that output planetary gear sets 44 and 50 combine the mechanical output of electric motor 12 with the hydromechanical outputs produced by electric motor 10 to produce second range propulsion and steer, whereas first range propulsion and steer is produced by motor 10 alone.

For first range operation of transmission 14, motor 12 is de-energized, and brake 68 is engaged to ground cross shaft 58 and ring gears 44r and 50r of output planetary gear sets 44 and 50. Motor 10 is energized to drive sun gears 40s and 42s in the forward direction, while the strokes of hydraulic pumps 32 and 36 are set at a negative displacement value to drive ring gears 40r and 42r in the reverse direction. At standstill, the forward and reverse speeds cancel, thus producing zero hydromechanical outputs on carriers 40c and 42c of planetary gear sets 40 and 42. Acceleration in the forward direction through first range is then produced by uniformly changing the pump strokes in the positive direction, i.e. decreasing negative stroke to zero and then increasing positive stroke. A steer can be executed at any time by changing the strokes (displacements) of pumps 32 and 36 in equal (or unequal) increments in relatively opposite directions. First range propulsion in the reverse direction is produced by increasing the negative pump strokes. To achieve increased reverse speed, the direction of the motor 10 mechanical output is reversed. High forward and reverse speeds in first range can be achieved by increasing the mechanical output speed of motor 10. It is seen that, with ring gears 44r and 50r grounded by brake 68, the hydromechanical outputs on carriers 40c and 42c are applied to transmission output shafts 16a and 18a through the sun-to-carrier reductions of output planetary gear sets 44 and 50.

For second range propulsion, brake 68 is released, and, concurrently, motor 12 is energized in the forward direction. Its mechanical output then drives ring gears 44r and 50r in the forward direction in combination with the forward drive applied to sun gears 44s and 50s by the hydromechanical outputs of planetary gear sets 40 and 42. Thus forward speeds above those achieved in first range are obtained. Again, speed variations are produced by varying the strokes of pumps 32 and 36 (uniformly for straightline propulsion and differentially for steer propulsion). To increase speed coverage in second range, the speeds of the mechanical outputs of either or both electric motors can be increased.

Figure 2:
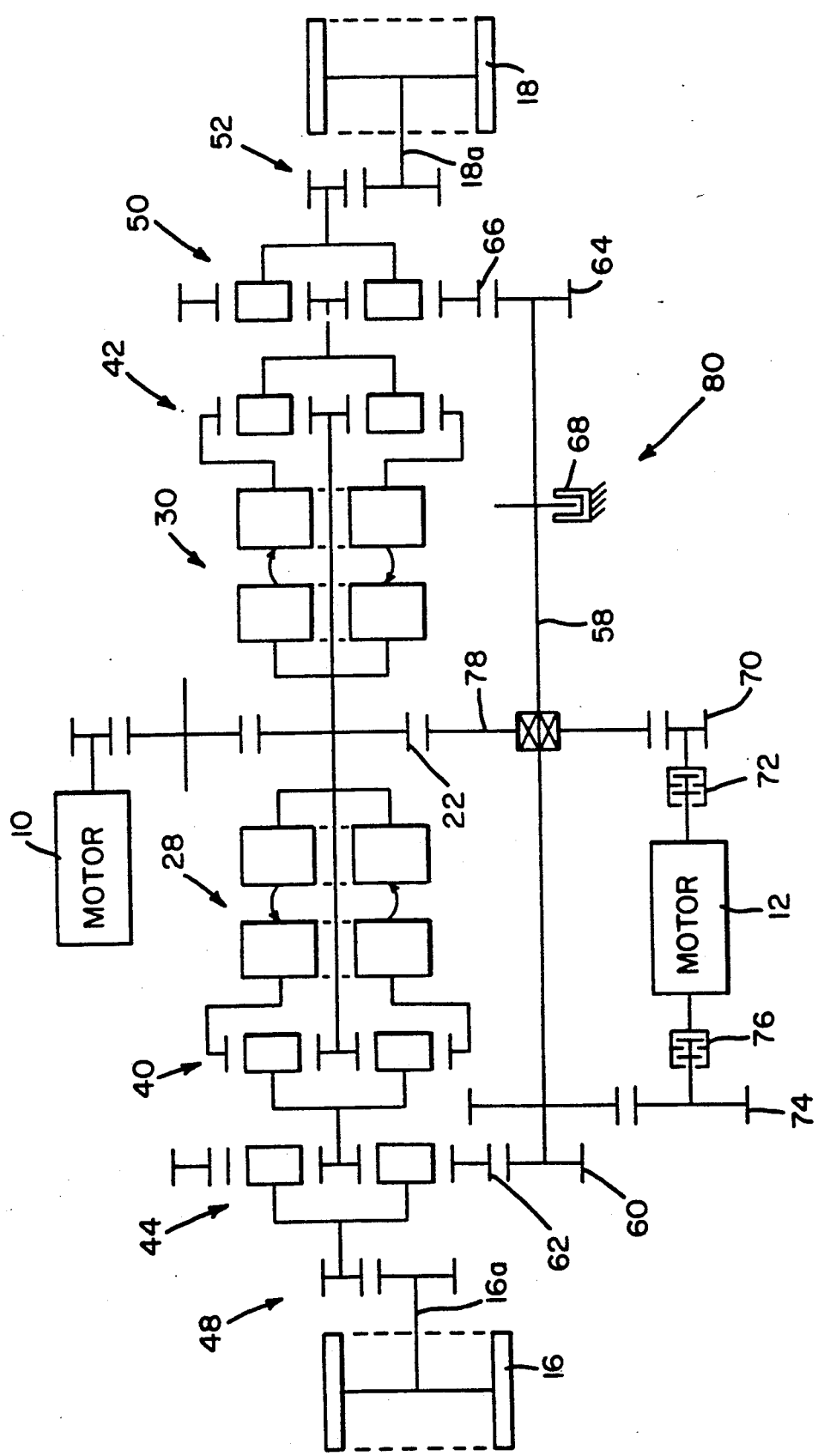
FIG. 2 is a schematic diagram of an electric drive system constructed in accordance with an alternative embodiment of the invention.

In the embodiment of FIG. 2, the transmission is modified such that electric motor 12 assists motor 10 in providing increased torque in first range propulsion. To this end, the mechanical output of electric motor 12 is applied to one output pinion gear 70 through a clutch 72 and to a second output pinion gear 74 through a clutch 76. Pinion gear 70 drives spur gear 22 via an idler gear 78 journalled on cross shaft 58. Pinion gear 74 meshes with a spur gear 75 fixed on cross shaft 58. In all other respects, transmission 80 in FIG. 2 corresponds to transmission 14 in FIG. 1.

To operate transmission in first range, clutch 76 is disengaged, and brake 68 is engaged to ground cross shaft 58, as in the case of transmission 14 of FIG. 1. Electric motors 10 and 12 are energized, and clutch 72 is engaged, such that the mechanical outputs of both electric motors drive spur gear 22. Thus, first range, forward and reverse straightline and steer propulsion is derived from the hydromechanical outputs on the carriers of planetary gear sets 40 and 42 produced by both electric motors. With the first range propulsion contribution of electric motor 12, the size of electric motor 10 can be reduced.

In second range, clutch 72 and brake 68 are disengaged as clutch 76 is engaged, and thus the mechanical output of electric motor 12 is combined in output planetary gear sets 44 and 50 with the hydromechanical outputs of planetary gear sets 40 and 42 produced by electric motor 10 in the manner described above for transmission 14 of FIG. 1.

Figure 3:
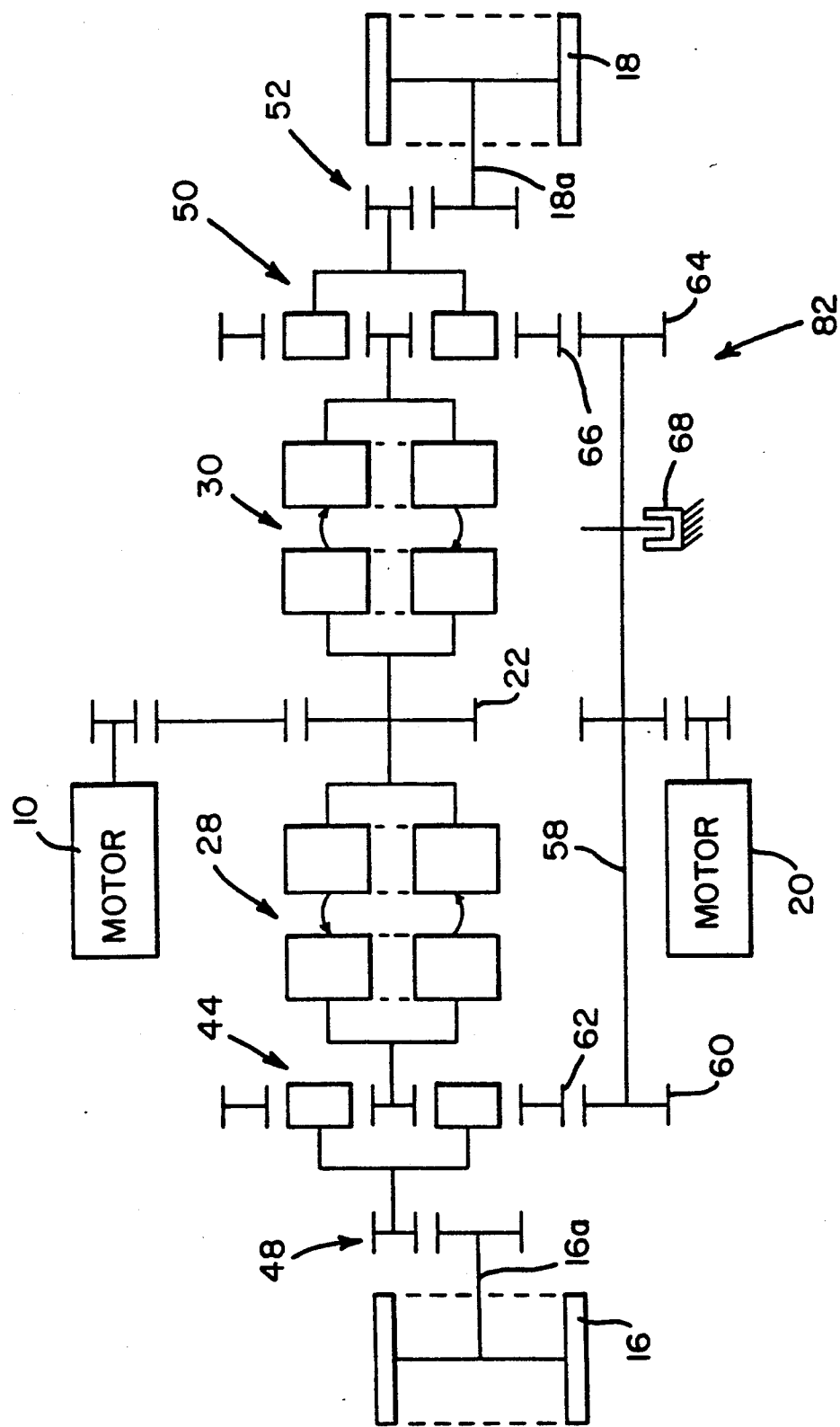
FIG. 3 is a schematic diagram of an electric drive system constructed in accordance with a further embodiment of the invention.

FIG. 3 illustrates a further embodiment of the invention, wherein the first range of transmission 82 is purely a hydrostatic range. This being the case, the hydrostatic and mechanical drive combining planetary gear sets 40 and 42 and cross shaft 26 of FIGS. 1 and 2 are eliminated. The hydrostatic outputs of hydrostatic propulsion units 28 and 30 are thus applied directly to the sun gears of output planetary gear sets 44 and 50 for first range variable speed, forward and reverse straightline and steer propulsion. In second range, brake 68 is released and electric motor 12 is energized to apply its mechanical output to the ring gears of output planetary gear sets 44 and 52 to provide hydromechanical outputs to the transmission output shafts 16a and 18a. The operation of transmission 82 is basically the same as for transmissions 14 and 80, except that there is no mechanical output contribution of electric motor 10 to first and second range propulsion.

From the foregoing description, it is seen that the present invention provides an electric drive system for tracklaying vehicles, which utilizes a transmission capable of providing positive steering control and regenerative power transfer from the inside track to the outside track during a steer. The various exemplary embodiments disclosed herein illustrate the versatility of the invention in its applicability to meet a wide range of torque and speed requirements. The use of electric motors as the vehicle prime mover enables the drive system to share electrical power with other onboard electricity consuming systems. In addition, in appropriate situations, either electric motor could function as a generator driven by vehicle kinetic energy to supply electrical power to other electrical systems, such as the armament system of a military tank.

As the foregoing demonstrates, the objectives of the invention set forth above, including those made apparent from the Detailed Description, are efficiently attained, and, since certain changes may be made in the constructions set forth without departing from the scope of the invention, it is intended that matters of detail be taken as illustrative and not in a limiting sense.

Having described the invention, what is claimed as new and desired to secure by Letter Patent is:

1. An electrical drive system for track-laying vehicles comprising, in combination:
   A. a first electric motor for developing a first mechanical output;
   B. a second electric motor for developing a second mechanical output; and
   C. a transmission including
      1) a left output shaft drivingly connected to one vehicle track,
      2) a right output shaft drivingly connected to the other vehicle track,
      3) first and second variable stroke hydrostatic propulsion units commonly driven by said first mechanical output to produce respective infinitely variable speed first and second hydrostatic outputs, 4) a left output combining gear set having a first gear element driven by said first hydrostatic output, a second gear element drivingly connected with said left output shaft, and a third gear element, 5) a right output combining gear set having a first gear element driven by said second hydrostatic output, a second gear element drivingly connected with said right output shaft, and a third gear element, 6) means for commonly applying said second mechanical output to said third gear elements of said left and right output gear sets, and 7) a brake operating to ground said third gear elements of said left and right output gear sets to produce low range vehicle propulsion and steer and, with said second electric motor energized, to release said third gear elements of said left and right output gear sets to produce high range vehicle propulsion and steer.

2. The electric drive system defined in claim 1, wherein said left and right output gear sets are identical planetary gear sets.

3. The electric drive system defined in claim 2, wherein said first, second and third gear elements of said left and right output gear sets are sun gears, planetary pinion gears and ring gears, respectively.

4. The electric drive system defined in claim 1, wherein said transmission further includes 1) a first combining gear set having a fourth gear element driven by said first hydrostatic output, a fifth gear element driven by said first mechanical output, and a sixth gear element producing a first hydromechanical output to drive said first gear element of said left output gear set, and 2) a second combining gear set having a fourth gear element driven by said second hydrostatic output, a fifth gear element driven by said first mechanical output, and a sixth gear element producing a second hydromechanical output to drive said first gear element of said right output gear set.

5. The electrical drive system defined in claim 4, wherein said left and right output gear sets are identical planetary gear sets, and said first and second combining gear sets are identical planetary gear sets.

6. The electrical drive system defined in claim 5, wherein said first, second and third gear elements of said left and right output gear sets are sun gears, planetary pinion gears, and ring gears, respectively.

7. The electrical drive system defined in claim 6, wherein said fourth, fifth and sixth gear elements of said first and second combining gear sets are ring gears, sun gears, and planetary pinion gears, respectively.

8. The electrical drive system defined in claim 4, wherein said second mechanical output applying means includes 1) a first drivetrain for applying said second mechanical output to said third elements of said left and right output gear sets, and 2) a second drivetrain for applying said second mechanical output to said fifth gear elements of said first and second combining gear sets in combination with said first mechanical output.

9. The electrical drive system defined in claim 8, wherein said second mechanical output applying means further includes 1) a first clutch operating to disengage said second electric motor from said first drivetrain for low range vehicle propulsion and steer and to engage said second electric motor with said first drive train for high range vehicle propulsion and steer, and 2) a second clutch operating to engage said second electric motor with said second drivetrain for low range vehicle propulsion and steer and to disengage said second electric motor from said second drivetrain for high range vehicle propulsion and steer.

10. The electrical drive system defined in claim 9, wherein said left and right gear sets are identical planetary gears sets, and said first and second combining gear sets are identical planetary gear sets.

11. The electrical drive system defined in claim 10, wherein said first, second and third gear elements of said left and right output gear sets are sun gears, planetary pinion gears, and ring gears, respectively.

12. The electrical drive system defined in claim 6, wherein said fourth, fifth and sixth gear elements of said first and second combining gear sets are ring gears, sun gears, and planetary pinion gears, respectively.

13. An electric drive system for track-laying vehicles comprising, in combination:

A. a first electric motor;
B. a second electric motor; and
C. an infinitely variable speed hydromechanical steering transmission driven by said first and second electric motors and including 1) a pair of hydrstatic propulsion units driven by said first electric motor, 2) a left output shaft drivingly connected to one vehicle track, 3) a right output shaft drivingly connected to the other vehicle track, and 4) gearing means for combining respective hydrostatic outputs of said hydrostatic units produced by said first electric motor and mechanical outputs produced by said second electric motor to generate propulsion outputs on said left and right output shafts for propelling the vehicle in at least one of two speed ranges of straightline and steer propulsion.

14. The electric drive system defined in claim 13, wherein said gearing means is configured to generate hydrostatic propulsion outputs on said left and right output shafts produced by said first electric motor for low range vehicle propulsion and steer and to generate hydromechanical propulsion outputs on said left and right output shafts produced by both said first and second electric motors for high range vehicle propulsion and steer.

15. The electric drive system defined in claim 13, wherein said gearing means is configured to generate hydromechanical propulsion outputs on said first and second output shafts produced by said first electric motor for low range vehicle propulsion and steer and to generate hydromechanical propulsion outputs on said first and second output shafts produced by both said first and second electric motors for high range vehicle propulsion and steer.

16. The electric drive system defined in claim 13, wherein said gearing means is configured to generate hydromechanical propulsion outputs on said first and second output shafts produced by both said first and second electric motors for at least two speed ranges of vehicle propulsion and steer.

* * * * *